(12) United States Patent
Upadhyay et al.

(10) Patent No.: US 11,899,701 B2
(45) Date of Patent: *Feb. 13, 2024

(54) IDENTIFYING FALSE POSITIVES BETWEEN MATCHED WORDS

(71) Applicant: PAYPAL, INC., San Jose, CA (US)

(72) Inventors: Rushik Upadhyay, San Jose, CA (US); Dhamodharan Lakshmipathy, San Jose, CA (US); Nandhini Ramesh, San Jose, CA (US); Aditya Kaulagi, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/353,939

(22) Filed: Jun. 22, 2021

(65) Prior Publication Data

US 2021/0311977 A1 Oct. 7, 2021

Related U.S. Application Data

(63) Continuation of application No. 16/236,550, filed on Dec. 30, 2018, now Pat. No. 11,042,580.

(51) Int. Cl.
*G06F 16/33* (2019.01)
*G06F 16/335* (2019.01)
*G06F 40/295* (2020.01)

(52) U.S. Cl.
CPC .......... *G06F 16/334* (2019.01); *G06F 16/335* (2019.01); *G06F 40/295* (2020.01)

(58) Field of Classification Search
CPC .. G06F 16/334; G06F 16/335; G06F 16/3334; G06F 40/295
See application file for complete search history.

(56) References Cited

U.S. PATENT DOCUMENTS

2009/0307771 A1 12/2009 Rajan et al.
2010/0180199 A1* 7/2010 Wu ........................ G06F 40/295
715/256

(Continued)

OTHER PUBLICATIONS

International Application No. PCT/US2019/069002, International Preliminary Report on Patentability dated Jul. 15, 2021, 11 pages.

(Continued)

*Primary Examiner* — Irete F Ehichioya
*Assistant Examiner* — Xiaoqin Hu
(74) *Attorney, Agent, or Firm* — HAYNES AND BOONE, LLP (57) ABSTRACT

A method may include determining that input text data includes a first keyword from a first set of keywords. The method also includes determining a similarity between the input text data and a first stored text string that has previously been identified as a false positive match for the first keyword, and based on the similarity, generating a first false positive score corresponding to the input text data. Further, the method includes determining a number of keywords, from a second set of keywords, that are included in the input text data, and based on the number of keywords, generating a second false positive score corresponding to the input text data. The method also includes calculating a final false positive score corresponding to the input text data based on the first false positive score and the second false positive score.

20 Claims, 6 Drawing Sheets

(56) References Cited

U.S. PATENT DOCUMENTS

| | | |
|---|---|---|
| 2011/0213777 A1 | 9/2011 | Sun |
| 2013/0159306 A1 | 6/2013 | Janssen, Jr. et al. |
| 2018/0060287 A1 | 3/2018 | Srinivasan et al. |
| 2019/0087428 A1* | 3/2019 | Crudele ................ G06F 40/279 |

OTHER PUBLICATIONS

International Application No. PCT/US2019/069002, International Search Report and Written Opinion dated Mar. 31, 2020, 11 pages.

* cited by examiner

| | Suspicious Keyword | Additional Keyword | Frequency Score |
|---|---|---|---|
| 302 | HTC | Phone | 100,000 |
| 304 | HTC | Touch | 75,000 |
| 306 | HTC | 4g | 24,000 |
| 308 | HTC | 3g | 22,000 |
| 310 | HTC | Android | 22,000 |
| 312 | HTC | Unlocked | 21,000 |
| 314 | HTC | Peroxide | 65 |
| 316 | HTC | Web | 400 |
| 318 | HTC | School | 330 |
| | HTC | ... | ... |

IDENTIFYING FALSE POSITIVES BETWEEN MATCHED WORDS

RELATED APPLICATIONS

This application is a continuation of U.S. application Ser. No. 16/236,550, filed Dec. 30, 2018, now U.S. Pat. No. 11,042,580, which is hereby incorporated by reference in its entirety.

BACKGROUND

Technical Field

This disclosure relates generally to matching textual information and, more specifically, to identifying false positive between matched words.

Description of the Related Art

The ability to match textual information is a frequent endeavor among various computer systems today. For instance, Internet search algorithms attempt to match input text from a user with webpages that contain similar text to the input text. Numerous other contexts also exist in which a system attempts to match an input text data with stored text data. In certain cases, some of the search results from matching the input text data with the stored text data are not relevant to the intention of party intimating the search result, even though the input text data may match portions of the stored text data.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation-[entity] configured to [perform one or more tasks]-is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "final scoring module configured to calculate a final false positive score" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(±) for that claim element. Accordingly, none of the claims in this application as filed are intended to be interpreted as having means-plus-function elements. Should Applicant wish to invoke Section 112(±) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As used herein, the term "text data" may refer to any type of data corresponding to textual information, such as strings, Unicode characters, and/or the like.

DETAILED DESCRIPTION

Techniques are disclosed for an algorithm for identifying false positive between matched words. In certain embodiments, a service provider server of a service provider may be configured to receive instructions to search stored text data to identify a match for input text data. These instructions may be received, and the techniques described herein can be applied, under various contexts. For example, the search may be a web search, and the input text data may correspond to one or more search terms. The stored text data may correspond to text data of one or more web pages that are to be searched with respect to the search terms. In another example, the stored text data may be included in an electronic file, such as an index file, and may store certain keywords such as entity names and/or text descriptions related digital transactions (e.g., item descriptions and/or the like). Additionally, the input text data may correspond to names of one or more parties participating in a digital transaction being processed by the service provider server and/or other text data related to the digital transaction, such as item descriptions, purchase information, and/or the like. As such, the index file may be searched to identify any keywords that are a match for the input text. It will be appreciated that numerous other contexts in which input text data is searched against stored text data are also possible.

According to a particular embodiment, the service provider server may determine that the input text data includes a suspicious keyword from a set of suspicious keywords. The set of suspicious keywords may be stored/maintained in an index file and may correspond to known suspicious entities and/or items. Thus, the service provider server may initially flag the input text data as being a match for a known suspicious entity corresponding to the suspicious keyword. Though the input text data is initially flagged as suspicious, the service provider server may execute a false positive scoring model to determine whether the input text data is actually a match for the suspicious entity represented by the suspicious keyword or if the initial flag is a false positive.

For example, consider the word "HTC", which can refer to High Tech Computer Corporation, which is a legitimate business. However, HTC can also refer to Hesa Trade Center, which may be a sanctioned Iranian aircraft company and therefore a suspicious entity. As such, if the input text data includes the suspicious keyword "HTC", the input text data may initially be flagged for potentially matching the corresponding suspicious entity/item (e.g., Hesa Trade Center) in the index file. In this example, the service provider server executes the false positive scoring model to determine a likelihood that the initial flagging of the input text data is a false positive match for the known suspicious entity Hesa Trade Center.

To this end, the service provider server may store a false positive file that stores text strings that have previously been identified as false positive matches for one or more suspicious keywords from the set of suspicious keywords. Further, the service provider server determines a set of text strings from the false positive file such that each text string of the set of text strings includes the suspicious keyword. The service provider server compares the input text data with each text string in the set of text strings, and based on this comparison, the service provider server calculates a first false positive score corresponding to the input text data. For example, the service provider server may determine respective cosine similarities between the input text data and each text string in the set of text strings. Based on the respective cosine similarities, the service provider server calculates the first false positive score corresponding to the input text data.

In addition, the service provider server is configured to generate a set of trusted keywords corresponding to the suspicious keyword. To this end, the service provider server calculates, for each word in the set of text strings (that were previously identified as false positives for the suspicious keyword), a respective frequency score. The frequency score for a particular word is calculated based on a number of times (e.g., frequency) the particular word is included in the set of text strings. Further, the service provider server identifies words having respective frequency scores that satisfy a frequency score threshold as trusted keywords. The identified trusted keywords are included in the set of trusted keywords. In some embodiments, the frequency score is calculated based on term frequency-inverse document frequency (TF-IDF).

Subsequently, the service provider server determines a number of trusted keywords, from the set of trusted keywords, that are included in the input text data. Based on the determined number, the service provider calculates a second false positive score. For instance, the second false positive score may be calculated based a percentage of words in the input text data that are trusted keywords from the set of trusted keywords.

The service provider server is further configured to calculate a final false positive score corresponding to the input text data based on the first false positive score and the second false positive score. According to a particular embodiment, the service provider server determines a first weight to apply to the first positive score and a second weight to apply to the second false positive score. As such, the service provider server adjusts the first false positive score by applying the first weight to the first false positive score and adjusts the second false positive score by applying the second weight to the second false positive score. The service provider server calculates the final false positive score by summing the adjusted first false positive score with the adjusted second false positive score.

In certain embodiments, upon calculating the final false positive score, the service provider server compares the final false positive score with a false positive score threshold. If the service provider server determines that the final false positive score satisfies the false positive score threshold, the service provider server identifies the input text data as a false positive match corresponding to the suspicious keyword. In some cases, the results of the comparison are transmitted back to false positive scoring model in a feedback loop. To this end, the results may be used to adjust the first weight and the second weight in future final false positive score calculations.

In certain embodiments, the techniques described herein reduces the likelihood of outputting false positive matches between input text data and stored text data. As a result, more relevant search results can be provided in response to search terms. Furthermore, in case where a service provider is monitoring transactions that may relate to suspicious activity by known suspicious entities, valuable time and resources can be saved from being spent reviewing transactions with text data that are likely to be false positive matches for the known suspicious entities.

Figure 1:
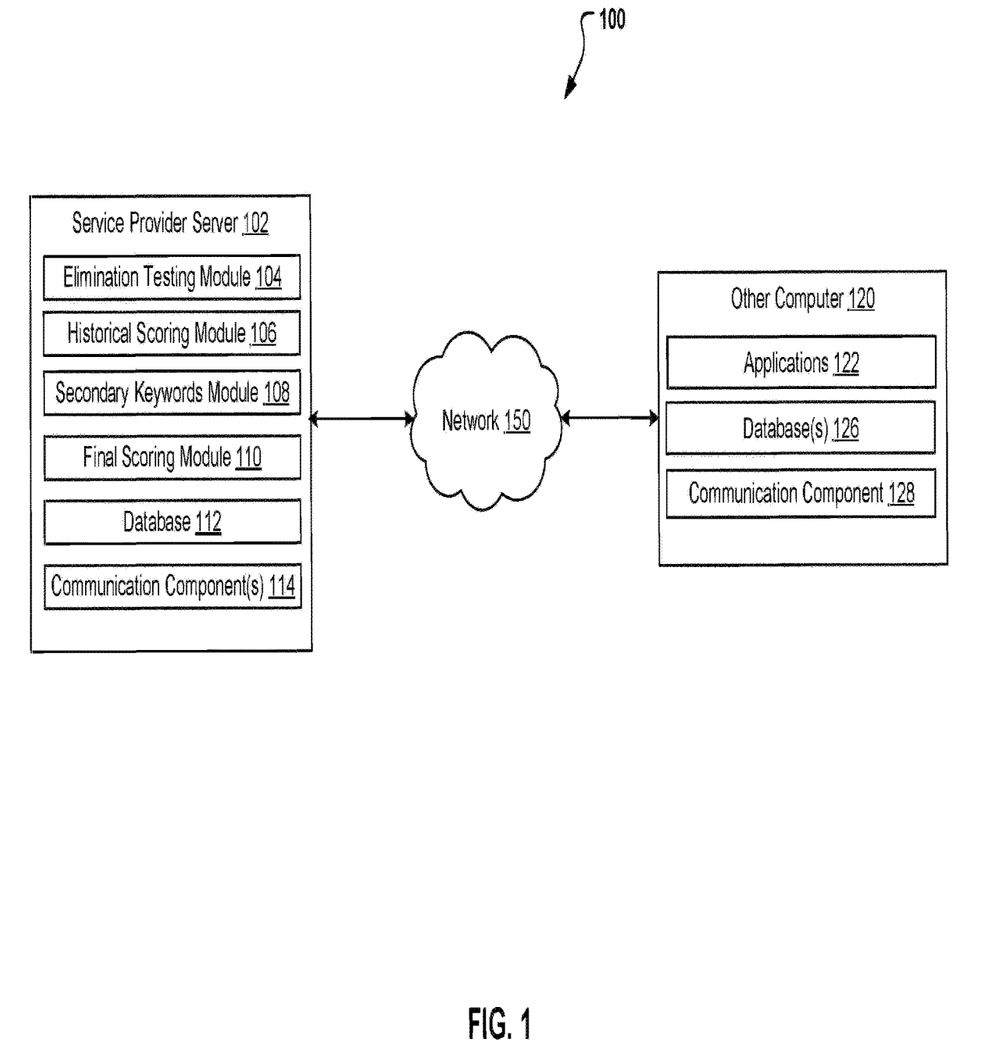
FIG. 1 is a block diagram illustrating an example system for identifying false positive between matched words, according to some embodiments.

FIG. 1 is a block diagram illustrating an example system 100 for identifying false positive between matched words. In the illustrated embodiment, the system 100 includes a service provider server 102 of a service provider in communication with other computer 120 via a network 150. The service provider server 102 may be configured to execute a false positive scoring model.

For example, the false positive scoring model may be used as part of a general search algorithm. The service provider server 102 may receive input text data (e.g., a search term) and compare the input text data with stored text data. As such, the service provider server 102 may determine if any of the text in the stored text data matches the input text data. In one embodiment, the search algorithm corresponds to an Internet search, and the input text data is provided by the other computer 120. The service provider 102 executes the false positive scoring model to identify any webpages that include text data that matches the input text data, but that nevertheless should not be returned a search result (e.g., a false positive).

In another embodiment, the service provider server 102 analyzes digital transactions to determine whether any party to the digital transaction (e.g., payors, payees, customers, merchants, etc.) is a known suspicious entity. Known suspicious entities may be individuals and/or organizations that are known to perpetrate fraud, terrorism, and/or other criminal or undesirable activities. To this end, the service provider server 102 may receive or may be configured to access an index file that stores text data corresponding to a set of known suspicious keywords that can represent suspicious entity names, suspicious items, and/or the like. The service provider server 102 may monitor text data associated with the digital transactions (e.g., text related to the names of the parties to the transaction, item descriptions for items being purchased, financial information, and/or the like) against the set of suspicious keywords and flag or generate alerts if a match is determined.

However, in certain instances, the input text data may match one or more suspicious keywords from the set of keywords even though the input text data may not actually relate to suspicious entities. In executing the false positive scoring model, the service provider server 102 determines a likelihood that the input text data is a false positive match for the entity or entities corresponding to the one or more suspicious keywords. The service provider server 102 calculates a false positive score with respect to the input text data and the one or more suspicious words. If the false positive score satisfies a false positive score threshold, the service provider server 102 determines that input text data is a false positive match for the entity or entities corresponding to the one or more suspicious keywords.

It will be appreciated that the above examples are for illustrative purposes and that false positive scoring model can be implemented in various other contexts. Further, the index file may be stored on the service provider server 102 and/or any other third-party computer or database, such as other computer 120.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, the service provider server 102 may include an elimination testing module 104, a historical soring module 106, a secondary keywords module 108, a scoring module 110, a database 112, and communication components 114. Each component of the service provider 102 may communicate with each other to execute the false positive scoring model, as will be describe in more detail below. Portions of FIG. 1 are described in conjunction with FIG. 2 and FIG. 3.

According to a particular embodiment, the service provider server 102 may receive input text data, such as from other computer 120 via applications 120. Further, the service provider server 102 may determine that the input text data includes a suspicious keyword from a set of suspicious keywords. In response to determining that the input text data includes the suspicious keyword, the service provider server may execute a false positive scoring model (e.g., via the elimination testing module 104, the historical scoring module 106, the secondary keywords module 108, and the final scoring module 110) with respect to the input text data and the suspicious keyword.

The elimination testing module 104 may be configured to determine whether the input text data and/or the suspicious keyword passes one or more elimination tests. According to a particular embodiment, if any of the elimination tests are failed, the service provider server 102 determines that the input text data is not a false positive match with the suspicious keyword and/or the known suspicious entity corresponding to the suspicious keyword. For instance, the final scoring module 110 assigns a score of 0, thereby indicating that the input text data is not a false positive match.

As one example of elimination test, the elimination testing module 104 may be configured to determine a riskiness of the suspicious keyword. The elimination testing module 104 may access a set previous alerts that were generated in response to past input text data matching the suspicious keyword. The set of previous alerts may be stored in the database 112 or another storage device that is local or remote to the service provider server 102. Each of the previous alerts in the set may be associated with a disposition indicating whether the alert was a false positive match for the suspicious keyword. Based on a number of alerts in the set of previous alerts that have a disposition indicating a false positive match for the suspicious keyword, the elimination testing module 104 may generate a riskiness score associated with the suspicious keyword. In some embodiments, the riskiness score is determined based on a percentage of alerts in the set of previous alerts that were classified as false positive matches for the suspicious keyword. As such, the greater the percentage, the lower the riskiness score. The elimination criteria test is failed if the elimination testing module 104 determines that the riskiness score is greater than or equal to a riskiness score threshold. Otherwise, the elimination test is passed.

As another example of elimination criteria, the elimination testing module 104 determines whether the input text data includes any words from a set of knockout keywords associated with the suspicious keyword. The elimination test is failed if the elimination testing module 104 determines that the input text data include at least one word from the set of knockout keywords. Otherwise, the elimination test is passed.

For example, consider the example previously discussed in which the suspicious keyword is "HTC" and the corresponding known suspicious entity is Hesa Trade Center, a sanctioned Iranian aircraft company. Again, HTC in some contexts can also refer to High Tech Computer Corporation. One of the keywords from the set of knockout keywords may be "aircraft." Thus, if the input text data includes the suspicious keyword "HTC" as well as the knockout keyword "aircraft", the service provider server 102 can directly determine that the input text data is not a false positive match for Hesa Trade Center. In other words, the input text data likely does not refer to High Tech Computer Corporation.

If the elimination module 104 determines that the elimination test(s) have been passed, the historical scoring module 106 is configured to generate a first false positive score corresponding to the input text data. To this end, the historical scoring module 104 accesses a set of previously stored text strings that include the suspicious keyword and that have previously been identified as false positive matches for the suspicious keyword and/or the known suspicious entity corresponding to the suspicious keyword. For instance, database 112 may store a false positive file that stores a set of all text strings that have previously been identified as false positive matches for various suspicious keywords of the set of suspicious keywords. As such, the set of previously stored text strings may be a subset of the set of all text strings. The set of previously stored text strings is generated by the historical scoring module 104 by filtering the set of all text strings in the false positive file for the suspicious keyword.

Further, this historical scoring module 104 is configured to compare the input text data with one or more of the text strings included in the set of previously stored text strings. Based on the comparison(s), the historical scoring module 104 calculates a first false positive score for the input text data. In some embodiments, the historical scoring module 104 is configured to determine respective similarities (e.g., respective cosine similarities or any other method of calculating similarity between text) between the input text data and one or more of the set of previously stored text strings. The first false positive score is then calculated based on the respective similarities.

Figure 2:
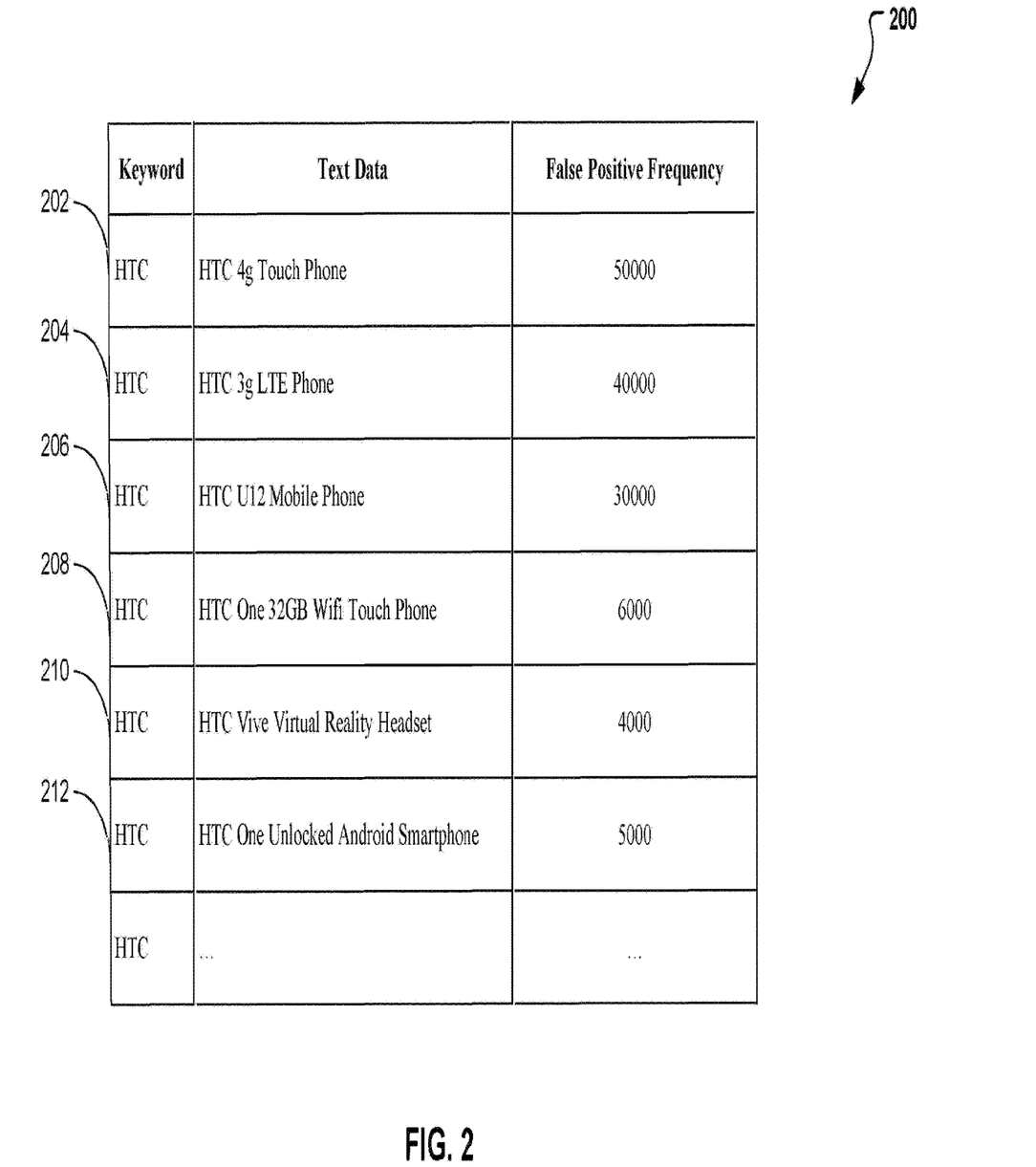
FIG. 2 illustrates an example table that stores text strings that have previously been identified as false positives, according to some embodiments.

For example, FIG. 2 illustrates an example table 200 that stores text strings that have previously been identified as false positives for the suspicious keyword "HTC." Each entry in the table 200 stores a text string in which the suspicious keyword appeared as well as a frequency with which the text string has been identified as a false positive for the suspicious keyword. For instance, entry 202 includes the text string "HTC 4g Touch Phone" and has a false positive frequency of 50000, which indicates the text string "HTC 4g Touch Phone" has been identified as a false positive for the suspicious keyword "HTC" 50000 times. Similarly, entry 204 includes the text string "HTC 3g LTE Phone" with a false positive frequency of 40000, entry 206 includes the text string "HTC U12 Mobile Phone" with a false positive frequency of 30000, entry 208 includes the text string "HTC One 23 GB Wifi Touch Phone" with a false positive frequency of 6000, entry 210 includes the text string "HTC Vive Virtual Reality Headset" with a false positive frequency of 4000, and entry 212 includes the text string "HTC One Unlocked Android Smartphone" with a false positive frequency of 5000.

Thus, in an example situation where the suspicious keyword included by the input text data is "HTC", the historical scoring module 104 compares the input text data with one or more of the text strings from entries 202,204,206,208,210, and 212. For instance, the historical scoring module 104 determines respective cosine similarities between the input text data and one or more of the text strings. In some embodiments, the historical scoring module 104 only compares the input text data with text strings of entries having a false positive frequency above a certain false positive frequency threshold.

In other embodiments, the historical scoring module 104 determines respective similarity values between the input text data and each of the text strings of the entries 202, 204,206,208,210, and 212. Further, the historical scoring module 104 identifies a subset of the respective similarity values that satisfy a similarity threshold and calculates the first false positive score based on the subset of the respective similarity values. In yet other embodiments, the historical scoring module 104 identifies the maximum similarity value from the respective similarity values and calculates the first false positive score based on the maximum similarity value. In general, the closer the input text data matches on of the text strings from entries 202, 204, 206, 208,210, and 212, the greater the first false positive score generated by the historical scoring module 106.

The secondary keywords module 108 is configured to calculate a second false positive score corresponding to the input text data. The second false positive score is calculated based on a number of keywords, from a set of secondary keywords associated with the suspicious keyword, that are included in the input text data. As such, a greater number of keywords from the set of secondary keywords that are included in the input text data results in a greater second false positive score for the input text data.

In order to generate the set of secondary keywords, the secondary keywords module 108 is configured to determine respective frequency scores corresponding to each word included in the set of previously stored text strings (generated by the historical scoring module 104) that have previously been identified as false positive matches for the suspicious keyword. According to certain embodiments, the secondary keyword module 108 calculates a respective frequency score for a particular word of the set of previously stored text strings based on a number of times the particular word is included in the set of previously stored text strings. For example, the second keyword module 108 may calculate the respective frequency scores using term frequency-inverse document frequency. As such, the secondary keyword module 108 generates the set of secondary keywords such that each secondary keyword in the set of second keywords is associated with a respective frequency score that is greater than or equal to a frequency score threshold.

Figure 3:
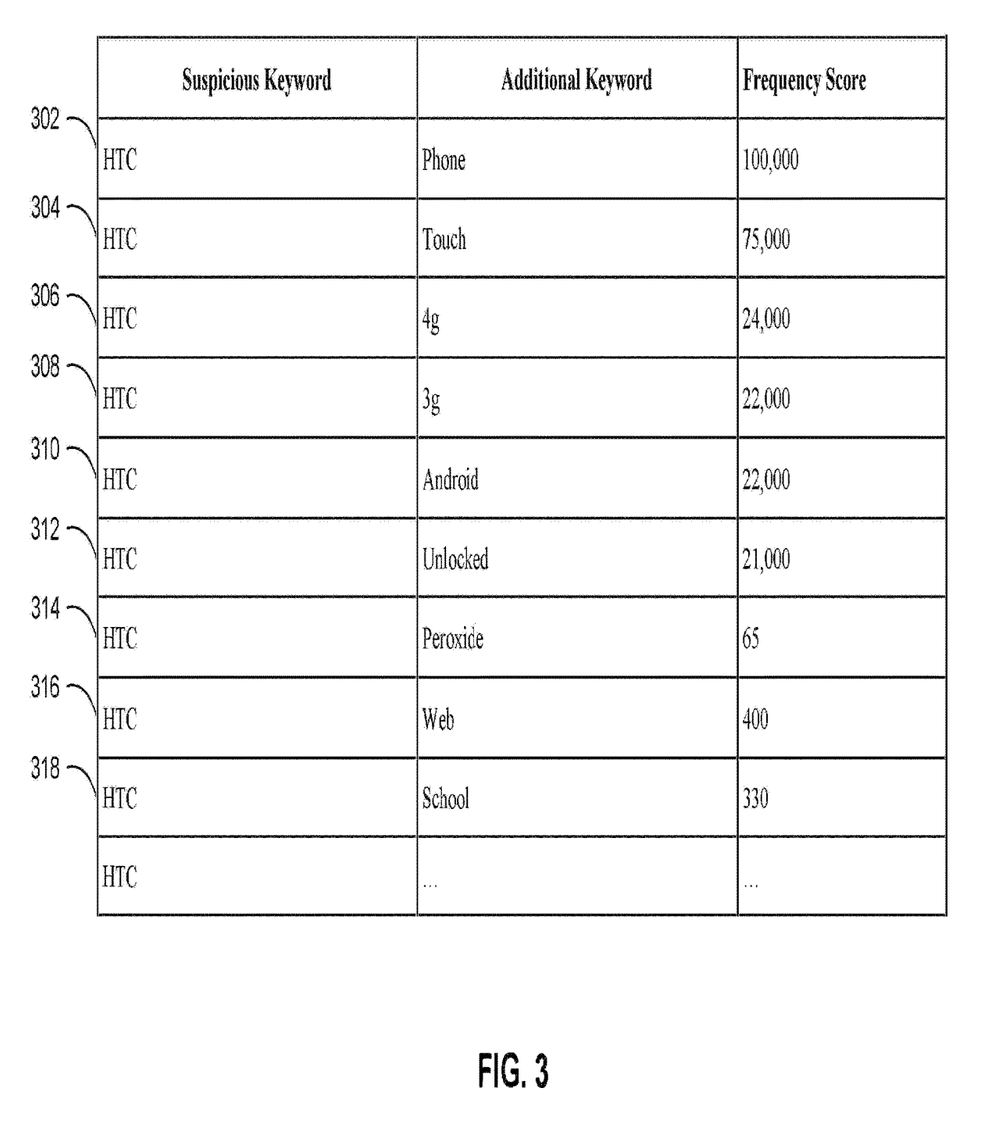
FIG. 3 illustrates an example table that is used to generate a set of secondary keywords associated with a suspicious keyword, according to some embodiments.

For example, FIG. 3 depicts an example table 300 that is used to generate the set of secondary keywords. Each entry of the table 300 stores an association between the suspicious keyword (e.g., "HTC" in this example), an additional keyword that is included in the set of previously stored text strings that were identified as false positive matches for the suspicious keyword (e.g., the text strings for the entries of table 200), and a frequency score associated with the additional keyword. For instance, entry 302 stores an association between the additional keyword "Phone" and a frequency score of 100,000, which may indicate the keyword "Phone" was included in the set of previously stored text strings with a relatively high frequency. Entry 304 stores an association between the additional keyword "Touch" and a frequency score of 75,000. Entry 306 stores an association between the additional keyword "4g" and a frequency score of 24,000. Entry 308 stores an association between the additional keyword "3g" and a frequency score of 22,000. Entry 310 stores an association between the additional keyword "Android" and a frequency score of 22,000. Entry 312 stores an association between the additional keyword "Unlocked" and a frequency score of 21,000. Entry 314 stores an association between the additional keyword "Peroxide" and a frequency score of 65. Entry 316 stores an association between the additional keyword "Web" and a frequency score of 400. Entry 318 stores an association between the additional keyword "School" and a frequency score of 330.

In some embodiments, the secondary keyword module 108 may generate the set of secondary keywords based on a frequency score threshold of 20,000. As such, the set of secondary keywords may include the words "Phone", "Touch", "4g", "3g", "Android", and "Unlocked". The set of secondary keywords may also be referred to as the set of trusted keywords for the suspicious keyword "HTC". This is because each keyword from the set of trusted keywords is included in the set of previously stored text strings (identified as false positive matches) with a relatively high frequency, thus indicating that these keywords are "trustworthy". As such, the secondary keyword module 108 may calculate a second false positive score for the input text data based on the number of times a word from the set of trusted keywords is included in the input text data.

Referring back to FIG. 1, the final scoring module 110 is configured to calculate a final false positive score corresponding to the input text data with respect to the known suspicious entity associated with the suspicious keyword. In particular, the final scoring module 110 calculates the final false positive score based on the first false positive score generated by the historical scoring module 106 and the second false positive score generated by the secondary keywords module 108. A greater false positive score may indicate a greater likelihood that the input text data is a false positive match and/or a greater confidence in the input text data being the false positive match for the suspicious keyword.

According to some embodiments, the final scoring module 110 is configured to adjust the first false positive score by applying a first weight to the first false positive score. Similarly, the final scoring module 110 is configured to adjust the second false positive score by applying a second weight to the second false positive score. Further, the final scoring module 110 generates the final false positive score by summing the adjusted first false positive score with the adjusted second false positive score. Additionally, the first weight and the second weight may be adjusted over time depending on future results of executing the false positive scoring model.

The communication component 114 may be configured to communicate with various other devices, such as the user computer 120 and/or other devices. In various embodiments, communication component 114 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the other computer 120, which includes applications 122, database 126, and communication component 128. According to one or more embodiments, the other computer 120 may provide, via the user application 122, an input text to the service provider server 102. As previously discussed, the input text could be an Internet search term, information included in a payment transaction, and/or any other text data used in a search.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 4:
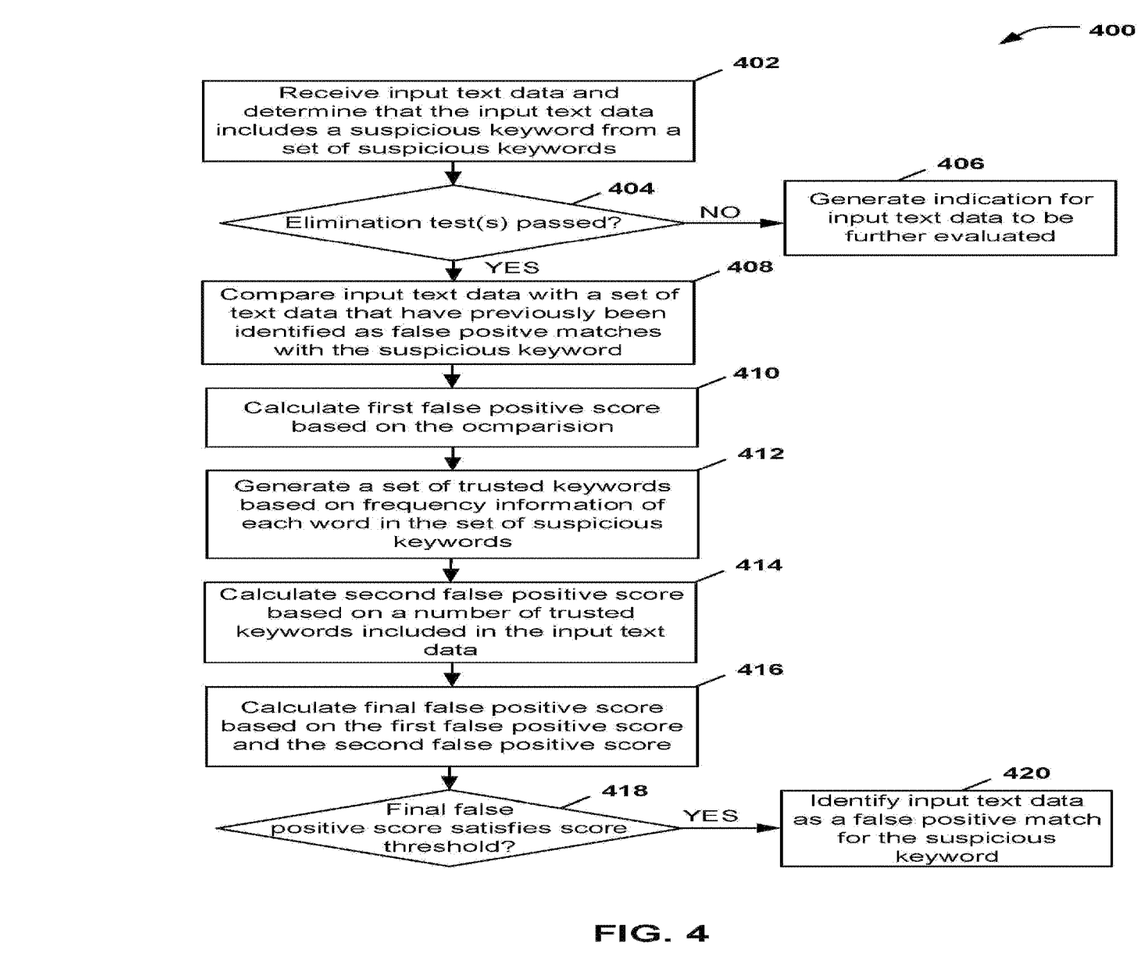
FIG. 4 is a flow diagram illustrating a method for identifying false positive between matched words, according to some embodiments.

FIG. 4 illustrates an example flow diagram of a method 400 for identifying false positive matches between words, according to a particular embodiment. The method 400 begins at step 402, where a service provider server, such as service provider server 102, receives input text data and determines that the input text data includes a first suspicious keyword from a set of suspicious keywords.

At step 404, the service provider server 102 determines whether one or more elimination tests have been passed. If not, the method 400 proceeds to step 406, where the service provider server 102 generates an indication for the input text data to be further evaluated as potential match for the suspicious entity corresponding to the suspicious keyword. If the one or more elimination tests have been passed, the method 400 proceeds to step 408, where the service provider server 102 compares the input text data with a set of text data that have previously been identified as false positive matches for the suspicious keyword.

At step 410, the service provider server 102 calculates a first false positive score corresponding to the input text data based on the comparison in step 408. At step 412, the service provider server 102 generates a set of trusted keywords based on frequency information of each word in the set of suspicious keywords. At step 414, the service provider server 102 calculates a second false positive score corresponding to the input text data based on a number of trusted keywords included in the input text data.

At step 416, the service provider server 102 calculates a final false positive score based on the first false positive score and the second false positive score. As previously discussed, the false positive score may be calculated based on applying a first weight to the first false positive score, applying a second weight to the second false positive score, and summing the adjusted first false positive score with the adjusted second false positive score.

At step 418, the service provider server 102 determines with the final false positive score satisfies a false positive score threshold. If so, the service provider server 102 identifies the input text data as a false positive match for the suspicious keyword.

Figure 5:
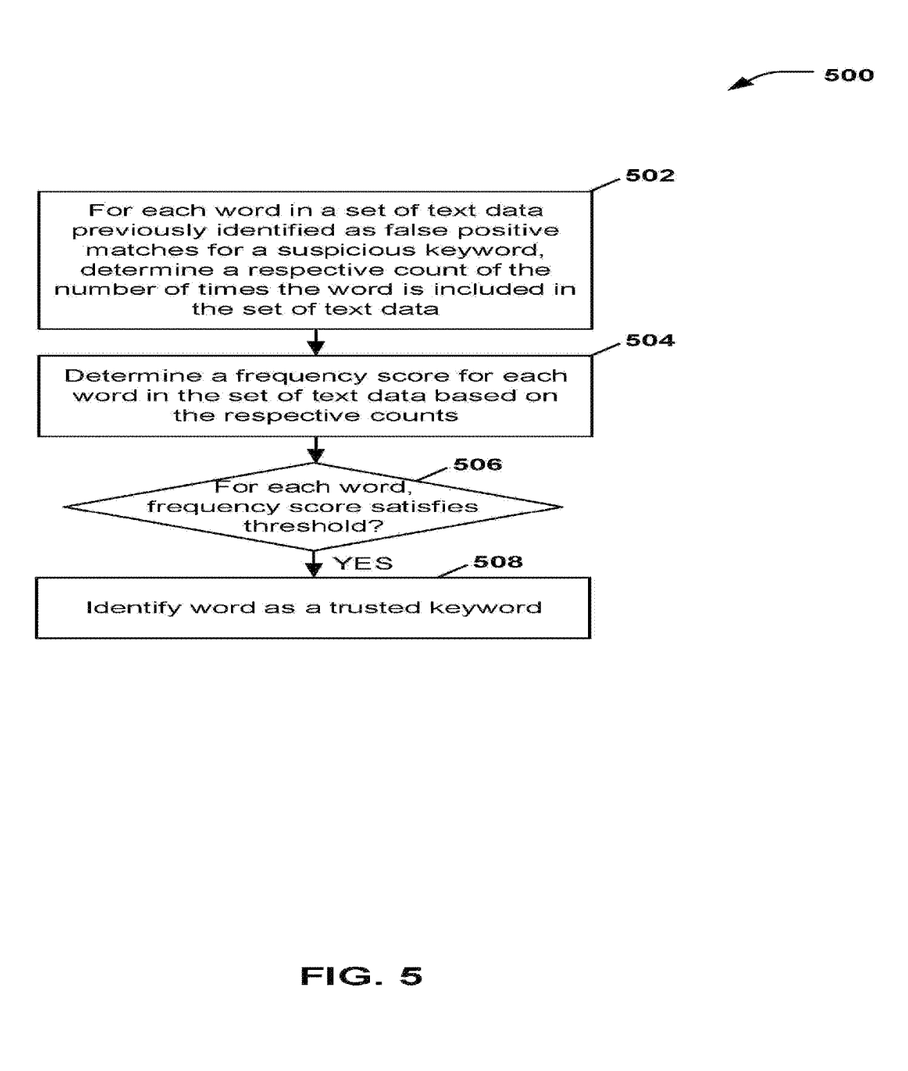
FIG. 5 illustrates a flow diagram illustrating a method for generating a set of secondary keywords associated with a suspicious keyword, according to some embodiments.

Referring now to FIG. 5 a flow diagram is depicted of a method 500 for generating a set of trusted keywords, according to an embodiment. The method 500 may be performed by the secondary keywords module 108 of the service provider server 102. The method 500 beings at step 502, where for each word in a set of text data previously identified as false positive matches for a suspicious keyword, the second keywords module 108 determines a respective count of the number of times the word is included in the set of text data.

At step 504, the secondary keywords module 108 determines a respective frequency score for each word in the set of text data based on the respective counts. At step 506, for each word in the set of text data, the secondary keywords module 108 determines if its respective frequency score satisfies a frequency score threshold. If so, at step 508, the second keywords module 108 identifies the word as a trusted keyword.

Example Computing Device

Figure 6:
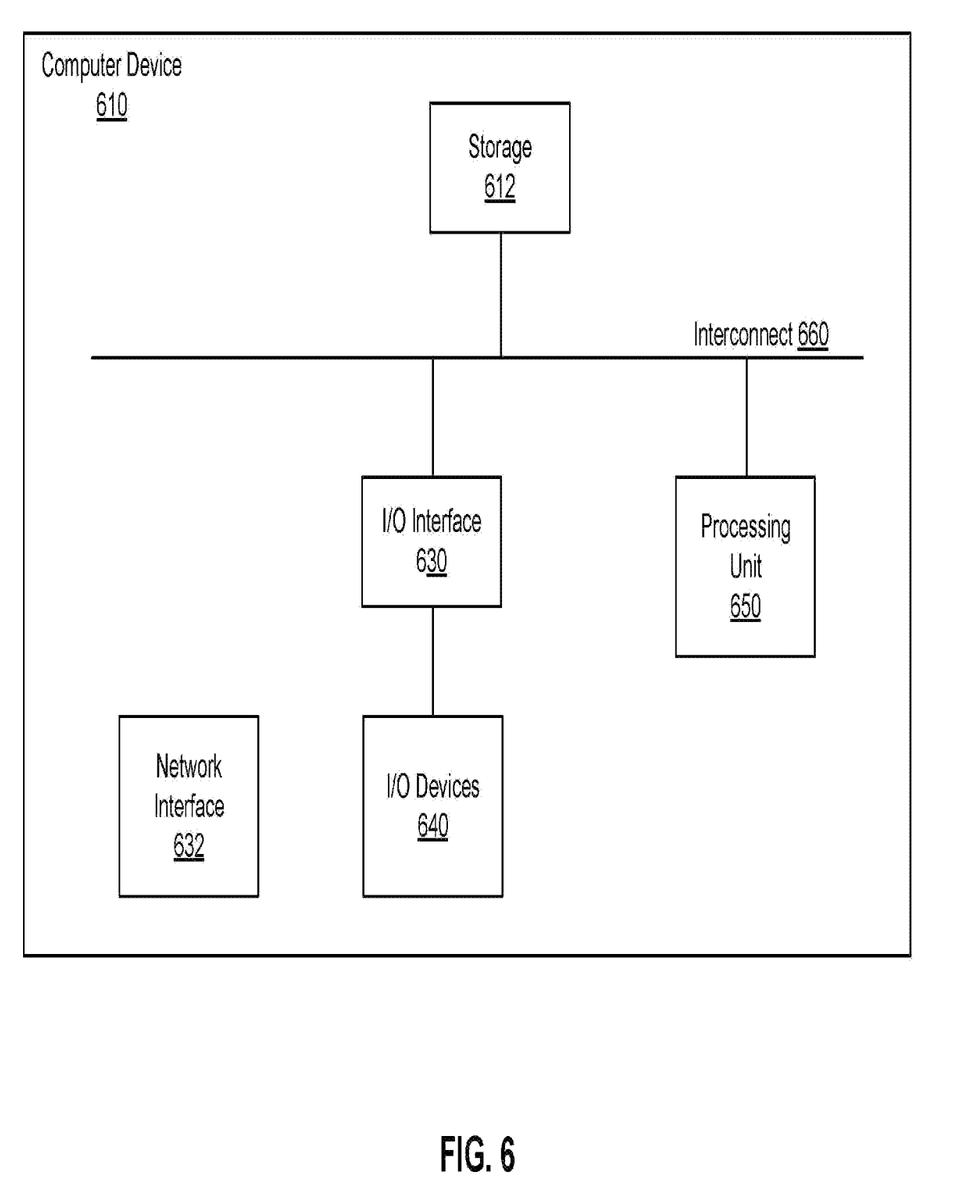
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including the components illustrated in FIG. 1. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

1/0 interface 630 may represent one or more interfaces and may be any of various types of interfaces configured to couple to and communicate with other devices, according to various embodiments. In one embodiment, 1/0 interface 630 is a bridge chip from a front-side to one or more back-side buses. 1/0 interface 630 may be coupled to one or more 1/0 devices 640 via one or more corresponding buses or other interfaces. Examples of 1/0 devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed:

1. A system comprising:
   one or more hardware processors; and
   a non-transitory memory storing computer-executable instructions, that in response to execution by the one or more hardware processors, causes the system to perform operations comprising:
   in response to receiving text data that corresponds to an Internet search, determining at least a portion of the text data is included in a first set of keywords previously identified by the system;
   calculating a first false positive score associated with the text data, wherein the first false positive score is calculated at least in part by comparing the text data to a plurality of text strings that contain one or more keywords from the first set of keywords, and wherein the plurality of text strings were previously determined to be false positive;
   determining a set of trusted keywords using at least a frequency score, wherein the frequency score is determined based at least in part on a frequency of each word of the plurality of text strings appearing in the plurality of text strings that were previously determined to be false positive;
   calculating a second false positive score associated with the text data, wherein the second false positive score is calculated based in part on a number of times a word from the set of trusted keywords is included in the text data;
   identifying, based on the first false positive score and the second false positive score, the text data as a match to a result type; and
   determining, based on the identifying, whether one or more webpages containing the text data should be returned as a result of the Internet search.

2. The system of claim 1, wherein the determining at least the portion of the text data is included in the first set of keywords comprises matching each term of the text data with an electronic file that contains a list of terms associated with fraud, terrorism, or criminal activities.

3. The system of claim 1, wherein the first false positive score is calculated at least in part based on a cosine similarity between the text data and the plurality of text strings.

4. The system of claim 1, wherein the operations further comprise:
   analyzing the text data for a result of an elimination test, wherein the result is based on a potential match to a keyword in the first set of keywords; and
   in response to the analyzing, determining that the first set of keywords create a false positive.

5. The system of claim 1, wherein the frequency score is based in part on a count associated with each word in the text data.

6. The system of claim 1, wherein the second false positive score is determined based in part on a determination that the frequency score satisfies a frequency score threshold.

7. The system of claim 1, wherein the result type is a suspicious word type.

8. The system of claim 1, wherein the first set of keywords are based on suspicious keywords.

9. A method, comprising:
accessing text data extracted from an Internet search;
determining at least a portion of the text data is included in a first set of keywords previously identified by a system;
calculating a first false positive score associated with the text data, wherein the first false positive score is calculated at least in part by matching the text data with a plurality of text strings of an electronic file, the plurality of text strings containing one or more keywords from the first set of keywords, wherein the plurality of text strings have been labeled as being false positive;
determining a set of trusted keywords using at least a frequency score, wherein the frequency score is determined based at least in part on a frequency of each word of the plurality of text strings appearing in the plurality of text strings;
calculating a second false positive score associated with the text data, wherein the second false positive score is calculated based in part on a percentage of words in the text data that comprises the set of trusted keywords;
identifying, based on the first false positive score and the second false positive score, the text data as a match to a result type; and
determining, based on the identifying, whether one or more webpages containing the text data should be returned as a result of the Internet search.

10. The method of claim 9, wherein the determining at least the portion of the text data is included in the first set of keywords comprises matching each term of the text data with an electronic file that contains a list of terms associated with fraud, terrorism, or criminal activities.

11. The method of claim 9, wherein the first false positive score is calculated at least in part based on a cosine similarity between the text data and the plurality of text strings.

12. The method of claim 9, further comprising:
analyzing the text data for a result of an elimination test, wherein the result is determined by a potential match to a keyword in the first set of keywords; and
based on the result of the analyzing, determining the first set of keywords create a false positive.

13. The method of claim 9, wherein the frequency score is based in part on a count associated with each word in the text data.

14. The method of claim 9, wherein the second false positive score is determined based in part on a determination that the frequency score satisfies a frequency score threshold.

15. The method of claim 9, wherein the result type is a suspicious word type.

16. A non-transitory computer readable medium storing computer-executable instructions that in response to execution by one or more hardware processors, causes a system to perform operations comprising:
determining at least a portion of an Internet search term is included in a first set of keywords previously identified by the system;
calculating a first false positive score associated with the Internet search term, wherein the first false positive score is calculated at least in part by comparing the Internet search term to a plurality of text strings that contain one or more keywords from the first set of keywords, and wherein the plurality of text strings were previously determined to be false positive;
determining a set of trusted keywords using at least a frequency score, wherein the frequency score is calculated based at least in part on a frequency of each word of the plurality of text strings appearing in the plurality of text strings that were previously determined to be false positive;
calculating a second false positive score associated with the Internet search term, wherein the second false positive score is calculated based in part on a percentage of words in the Internet search term that comprises the set of trusted keywords;
identifying, based on the first false positive score and the second false positive score, the Internet search term as a match to a result type; and
determining, based on the identifying, whether one or more webpages associated with the Internet search term should be displayed.

17. The non-transitory computer readable medium of claim 16, wherein the determining at least the portion of the Internet search term is included in the first set of keywords comprises matching each term of the Internet search term with an electronic file that contains a list of terms associated with fraud, terrorism, or criminal activities.

18. The non-transitory computer readable medium of claim 16, wherein the first false positive score is calculated at least in part based on a cosine similarity between the Internet search term and the plurality of text strings.

19. The non-transitory computer readable medium of claim 16, wherein the frequency score is based in part on a count associated with each word in the Internet search term.

20. The non-transitory computer readable medium of claim 16, wherein the second false positive score is determined based in part on a determination that the frequency score satisfies a frequency score threshold.

* * * * *